No. 685,884. Patented Nov. 5, 1901.
E. J. TRAUT.
PEA THRESHER.
(Application filed Dec. 6, 1900.)
(No Model.) 3 Sheets—Sheet 1.
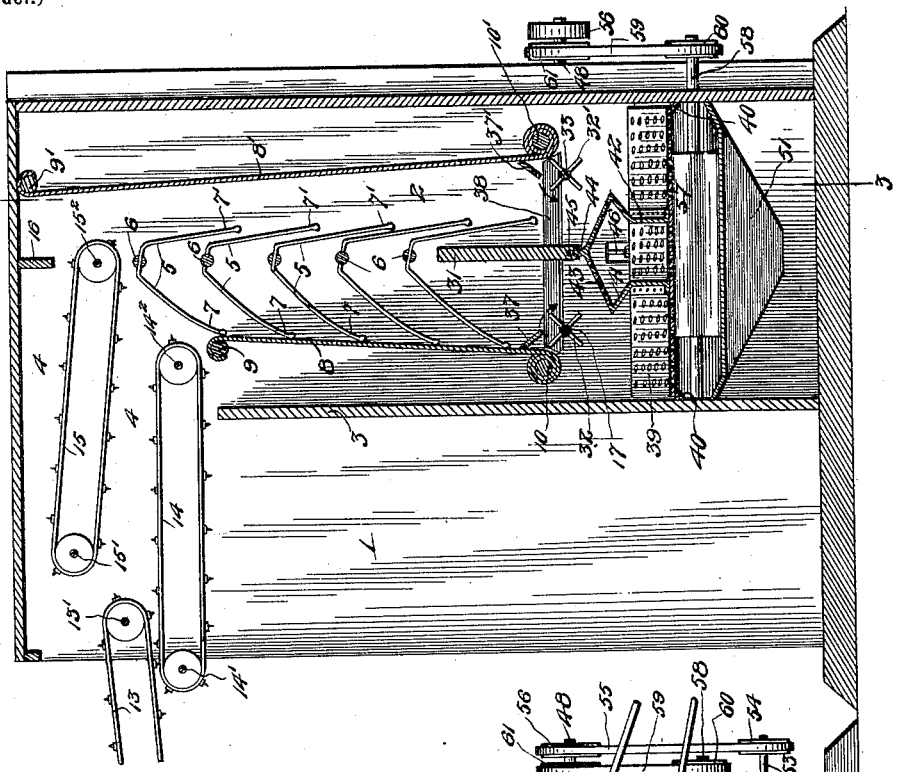

No. 685,884. Patented Nov. 5, 1901.
E. J. TRAUT.
PEA THRESHER.
(Application filed Dec. 6, 1900.)
(No Model.) 3 Sheets—Sheet 2.
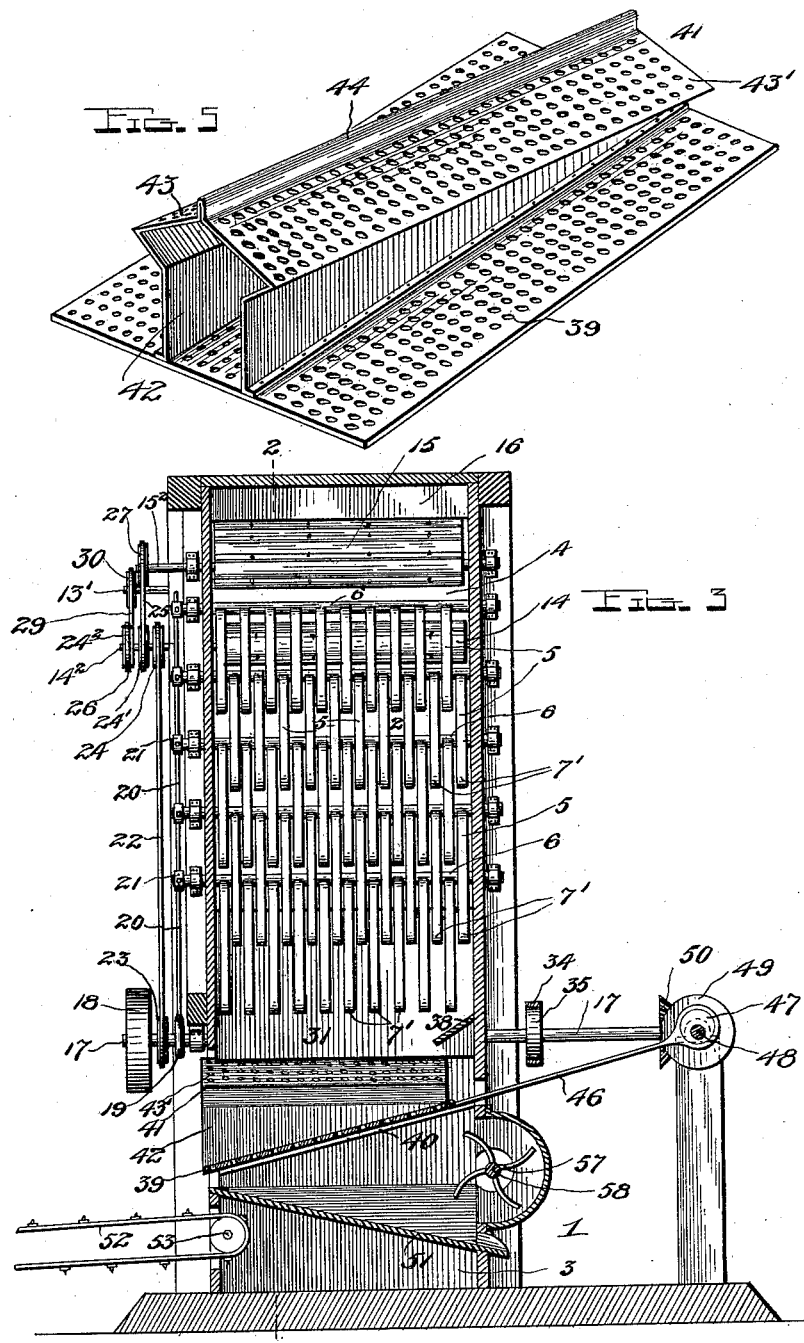
Witnesses
Inventor
E. J. Traut No. 685,884. Patented Nov. 5, 1901.
E. J. TRAUT.
PEA THRESHER.
(Application filed Dec. 6, 1900.)
(No Model.) 3 Sheets—Sheet 3.
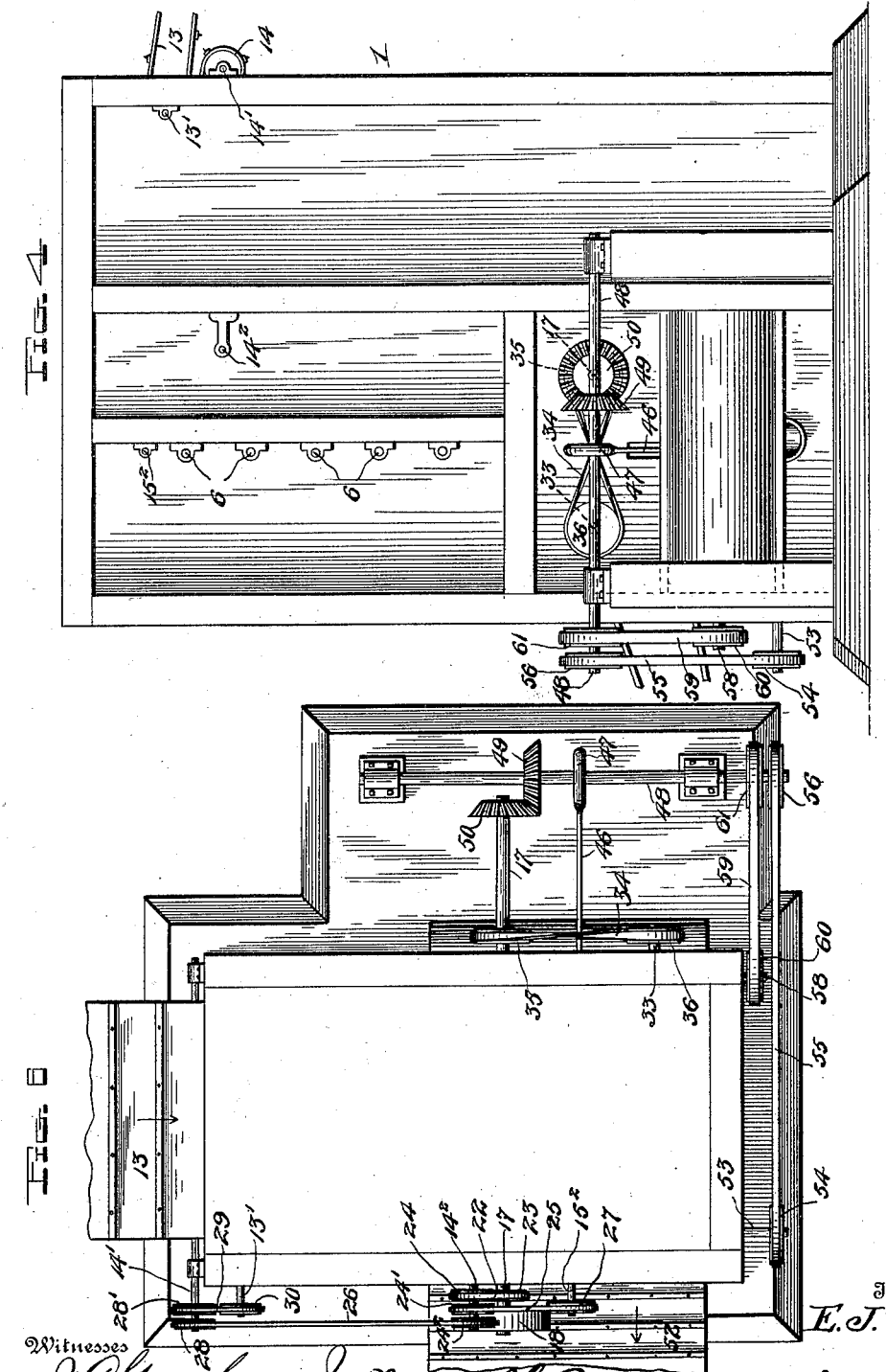

UNITED STATES PATENT OFFICE.

ED J. TRAUT, OF NORTHEAST, PENNSYLVANIA, ASSIGNOR OF ONE-HALF TO JAMES B. STULL, OF NORTHEAST, PENNSYLVANIA.

PEA-THRESHER.

SPECIFICATION forming part of Letters Patent No. 685,884, dated November 5, 1901.

Application filed December 6, 1900. Serial No. 38,945. (No model.)

*To all whom it may concern:*

Be it known that I, ED J. TRAUT, a citizen of the United States, residing at Northeast, in the county of Erie and State of Pennsylvania, have invented certain new and useful Improvements in Pea-Threshers; and I do declare the following to be a full, clear, and exact description of the invention, such as will enable others skilled in the art to which it appertains to make and use the same.

My invention relates to improvements in pea and bean threshers.

The objects of the invention are, first, to provide threshing mechanism so constructed as to effect a thorough separation of the peas from the pods without injury thereto; second, to provide for a more or less vigorous action of such mechanism, according to the condition of the peas; third, to provide means to prevent choking of the beaters and insure a proper feed of the peas or beans thereto; fourth, to provide simple and effective means for separating the peas or beans from the vines, pods, and other refuse matter, and, finally, to generally simplify and improve the construction and increase the practical efficiency of machines of this character.

With these and other minor objects in view the invention consists of certain novel features of construction, combination, and arrangement of parts, as will be hereinafter more fully described, and particularly pointed out in the appended claims.

In the accompanying drawings, Figure 1 is a front side elevation of a thresher embodying my invention. Fig. 2 is a vertical longitudinal section thereof on line 2 2 of Fig. 3. Fig. 3 is a vertical transverse section of the same on line 3 3 of Fig. 2. Fig. 4 is a rear side elevation of the thresher. Fig. 5 is a perspective view of the shaking-screen. Fig. 6 is a top plan view of the thresher.

Like reference characters designate corresponding parts throughout the several views.

The numeral 1 in the drawings represents the frame or casing of the thresher, which is provided with a threshing chamber or compartment 2, in which the beating and separating mechanisms are mounted. This chamber is formed by the rear wall, ceiling, and rear portion of the side walls of the casing, in connection with a vertical partition 3, which is of less height than said walls to provide an inlet-opening 4 at the upper front portion of the chamber for the feed of the peas or beans thereto.

On the interior of the threshing-chamber is arranged a series of vibrating beaters 5, mounted upon rock-shafts 6 to swing in a direction longitudinally of the casing and provided with downwardly-projecting oppositely-disposed diverging resilient arms 7 and 7', adapted to respectively strike against flexible aprons 8 and 8', located on opposite sides of said beaters. These aprons extend vertically within the chamber and are fastened at their upper ends to cross-bars 9 9' and at their lower ends are wound upon shafts or rollers 10 10', journaled in the sides of the casing. Each of these shafts or rollers is provided at one end with a ratchet-wheel 11, adapted to be engaged by a pawl 12, pivoted to the frame or casing, whereby the rollers may be turned to tighten or loosen up the aprons, according to the condition of the peas or beans acted on, as hereinafter described, and to hold the rollers fixed in adjusted position.

The vines as cut or mowed in harvesting are conveyed to the threshing-chamber through the medium of the endless conveyers or feed-belts 13, 14, and 15. The belt 13 is mounted at its inner end upon a shaft 13' and is adapted to convey the vines from the point of feed to the conveyer 14, which is mounted upon the shafts 14' 14² and extends from a point just under the inner end of the belt 13 into the threshing-chamber and is adapted to discharge its load from above to be acted upon by the beater-arms 7 and apron 8. The third feed-belt 15 is mounted upon the shafts 15' 15² and is so arranged as to act in the nature of a relief feed to convey to the beater-arms 7' and apron 8' any surplus or excess amount of the vines over that adapted to be conveniently conveyed by the belt 14 and acted upon by the beater-arms 7 and apron 8. In thus operating the belt 15 takes up from the belt 13 all the vines not taken up by the belt 14, and thereby obviates all liability of choking and stoppage of the feed. To regulate the feed of the vines to the beaters 7' and apron 8', a transverse stop 16 is provided at the top of the casing above the inner or rear end of the conveyer 15 to form therewith a contracted throat or passage, through which a definite quantity only of the vines may pass at a time, whereby a regular and even feed of the peas or beans is insured.

Motion is transmitted to the conveyer-belts and beaters through the medium of gearing consisting of a transverse drive-shaft 17, carrying at one end a pulley 18, adapted to be driven by a belt from a suitable source of power. On one end of this shaft is mounted an eccentric 19, having connected thereto a pitman-rod 20, which is in turn pivotally connected to a series of crank-arms 21, mounted upon the contiguous ends of the shafts 6, whereby a rocking motion is imparted to said shafts 6 and the beaters 5 in an obvious manner. The shaft $14^2$, which drives the conveyer-belt 14, is driven from the drive-shaft 17 by means of a belt or sprocket-chain 22, passed around pulleys or sprocket-wheels 23 24 on said shafts. The shaft $14^2$ also carries two other pulleys or sprocket-wheels $24'$ $24^2$, around which pass belts or sprocket-chains 25 and 26, which are respectively passed also around pulleys or sprocket-wheels 27 and 28 on the shafts $15^2$ and $14'$, whereby the belt 15 is driven. The shaft $14'$ is also connected to the shaft $13'$ by a belt or sprocket-chain 29, passing over pulleys or sprocket-wheels $28'$ 30 thereon, whereby the conveyer 13 is driven. It will thus be seen that all the parts of the feeding and threshing mechanisms thus far described are connected to move in unison and at definite predetermined speeds, so as to insure an effective coöperation between them. The beaters 5, it will be noted, are operated by the aforesaid connections with the drive-shaft to rock or vibrate upon the shafts 6, so that two sets or series of arms 7 $7'$ will alternately strike against the aprons 8 $8'$, and the arms of each set or series will simultaneously strike against the coöperating apron, as will be readily understood by reference to Fig. 2 of the drawings.

Between the flexible aprons 8 $8'$, below the lowermost rock-shaft 6 and in line therewith, is a vertical dividing-board 31, extending transversely of the chamber 2 and substantially parallel with said aprons, and at the lower ends of said aprons are rotary transverse beaters 32 $32'$, which coöperate with said board to perform a final beating action to thresh out the peas from the pods which have passed the beaters 5, which perform the primary beating action. These beaters 32 $32'$ are mounted, respectively, upon the drive-shaft 17 and a transverse shaft 33 and rotate in reverse directions, as indicated by the arrows in Fig. 2, to throw the vines and pods against the dividing-board 31, and thereby loosen up and release the peas from the vines and unbroken pods. The shaft 33 is rotated in the opposite direction to the drive-shaft 17 by means of a crossed belt 34, passed around pulleys 35 36 on the end of the shaft 17 opposite the pulley 18 and the contiguous end of said shaft 33 at the rear side of the frame opposite that on which the gearing previously described is mounted. Inclined shelves 37, $37'$, and 38 are arranged, respectively, on the inner sides of the flexible aprons and at the rear side of the chamber 2 to direct the vines, peas, and pods to the said rotary beaters 32 $32'$ and to the shaking-screen below, which will now be described.

The shaking-screen consists of a foraminous or perforate plate 39, which is mounted to reciprocate transversely of the frame on guide ledges or ways 40 and extends on a downward inclination from the rear side toward the front side of the frame in the lower portion of the chamber 2. On the central portion of this plate is arranged a conductor and deflector 41, having an inverted-trough-shaped body 42 in open communication with the plate 39 and perforate deflecting portions 43 $43'$, inclining downwardly from the center thereof and projecting beyond the opposite sides of the dividing-board 31, so as to cover the space between said board and the rotary beaters 32 $32'$. To guide the screen and conductor in a true path in its reciprocations and prevent wabbling thereof, a longitudinal guide rib or projection 44 is provided at the center of said conductor to slide within a slot 45, formed in the lower edge of the dividing-board, as clearly shown in Fig. 2. The screen is reciprocated rapidly in practice by means of a pitman-rod 46, operated by an eccentric 47 on a counter-shaft 48, arranged upon the rear side of the frame, which shaft is provided with a bevel-gear 49, meshing with a corresponding gear 50 on the contiguous end of the drive-shaft 17, whereby said counter-shaft is driven. Below the shaking-screen is arranged a pea board or conductor 51, inclining in a reverse direction thereto to discharge the peas into a suitable receptacle at the rear of the frame. The peas upon the screen drop downward therethrough onto said pea-board, while the vines, pods, chaff, and other refuse pass from the screen onto a discharge-belt or endless conveyer 52, which conveys the same to a suitable source of deposit. The inner end of this belt is mounted upon a shaft 53, which is provided at one end with a pulley 54, connected by a belt 55 with a pulley 56 on the counter-shaft 48. A fan 57 is located between the shaking-screen and pea-board at the rear side of the frame and delivers a constant blast of air to facilitate the discharge of the vines and refuse from said screen and the removal of the chaff and other lighter particles from the peas on the pea-board. The fan-shaft 58 receives motion from a belt 59, passed around pulleys 60 and 61 on said shaft and the counter-shaft 48.

In the operation of the thresher the beater-arms 7 and $7'$ are given a vibratory motion, so as to swing in the same direction, so that when one set of beater-arms is in operation the other set will be out of operation, thus adapting said sets of arms to act alternately, as will be readily understood. As the vines drop down between a flexible canvas apron and the coöperating set of arms—say the apron 8 and arms 7—a vigorous threshing action is set up by the arms thrusting the vines toward and striking the apron, whereby the latter is caused to vibrate and to thereby throw the vines back upon the arms, and this back-and-forth threshing operation is repeated as the vines descend, resulting in the quick and effective separation of all or practically all of the peas from the pods. Should, however, any unthreshed pods pass the beaters 7, the rotary beater 32 will act thereon, throwing the vines and pods against the dividing-board 31 and effecting the separation of the unthreshed peas from their pods. The vines, peas, and refuse matter after being threshed drop down onto the inclined portion 43 of the conductor and deflector 41 and a portion of the peas and chaff drop therethrough down onto the central portion of the screen 39, while the vines and remainder of the chaff are deflected down onto the adjacent side of said screen and are forced to the front by the shaking action thereof. The peas and lighter particles are thereby caused to drop through the screen onto the pea-board 51, while the vines and coarse refuse fall upon the conveyer 52 and are carried away. The peas on rolling down the grain-board are separated from the chaff by the action of the blast from fan 57, which forces the chaff out at the front and onto the conveyer, while the peas discharge from the pea-board at the rear into a suitable receptacle. The operation just described is of course the same in connection with the beaters 7' and flexible apron 8' and coöperating parts on the opposite side of the dividing-board 31 and will be readily understood from the foregoing description.

The purpose of employing the aprons 8 8', which may be made of canvas or other suitable material, is to provide a flexible surface for the beaters to strike against to prevent crushing or splitting of the peas, as well as to provide for the vibratory back-and-forth action referred to and adapt the thresher to operate more or less vigorously, according to the condition of the peas. When the peas are in a green state and soft, it is desirable to have the aprons loose, so as to increase their flexibility and adapt them to yield readily and not exert too vigorous a threshing action on the peas, which when green are readily crushed or split. When, however, the peas to be threshed have been harvested some time—say a week or ten days—and become hardened, it is desirable to exert a more vigorous threshing action in order to effect a thorough separation thereof from the pods. By means of the adjusting mechanism, consisting of the ratchet-wheel 11 and pawl 12, the tension or flexibility of the aprons may be increased or diminished as desired by loosening or flexing them, so as to coöperate with the beaters to exert a mild or vigorous threshing action, accordingly as the peas under treatment are soft or hard, in a manner readily understood.

While the drawings illustrate the invention in its preferred form, it will of course be understood that modifications within the scope of the invention as defined by the appended claims may be made without departing from the spirit or sacrificing any of the advantages thereof.

Having thus described my invention, what I claim, and desire to secure by Letters Patent, is—

1. In a thresher of the character described, the combination of vertically-disposed flexible aprons, vibrating beaters arranged between and adapted to strike against the aprons, means for operating the beaters, feeding mechanism for feeding the vines at the top between each flexible apron and the vibrating beaters so as to allow the vines to fall downward by gravity, and means located below the aprons and beaters for receiving the vines and peas and separating them from each other, substantially as described.

2. In a thresher of the character described, threshing means comprising vibrating beaters, a vertical flexible surface with which the beaters are adapted to contact, means for operating the beaters and means for varying the flexibility of said surface, substantially as set forth.

3. In a thresher of the character described, threshing means comprising vibrating beaters, means for operating the beaters, a vertical flexible stationary apron with which said beaters are adapted to contact, and means for feeding the peas and vines from above down between the beaters and aprons, substantially as described.

4. In a thresher of the character described, a pair of vertically-disposed flexible aprons, vibrating beaters arranged between and adapted to strike against said aprons, means for operating the beaters, and means for tightening or loosening up the aprons to vary the flexibility of said aprons.

5. In a thresher of the character described, threshing means comprising vibrating beaters, means for operating the beaters, an apron against which the beaters are adapted to strike, a shaft to which one end of the apron is connected whereby the flexibility of said apron may be varied, and means for securing said shaft against movement, substantially as described.

6. In a thresher of the character described threshing mechanism comprising a vertical flexible apron, primary beaters coöperating with said apron to thresh out the peas, a vertical board below the beaters and parallel with the apron, and an auxiliary beating device located adjacent to the lower end of the apron and adapted to throw the unthreshed peas passing the primary beaters against said board and to thereby coöperate therewith to perform the final separation of the peas passing the aforementioned primary beaters, substantially as set forth.

7. In a thresher of the character described, the combination of oppositely-disposed, flexible aprons, beaters adapted to strike alternately against said aprons, a dividing-board between the aprons and below said beaters, means for feeding the peas or beans to be threshed to the beaters, and further means for separating the vines and refuse matter from the peas, substantially as set forth.

8. In a thresher of the character described, the combination of a pair of oppositely-disposed, flexible aprons, primary beaters coöperating with said aprons to thresh out the peas, feed mechanism for feeding the pea-vines at the top between the aprons, a dividing-board between the aprons at the lower portions thereof, auxiliary beaters coöperating with said dividing-board to separate the unthreshed peas passing the primary beaters, and a reciprocating screen provided with oppositely-disposed conducting and deflecting portions arranged below the spaces between the aprons and dividing-board, substantially as set forth.

9. In a thresher of the character described, the combination of a pair of oppositely-disposed, flexible aprons, primary beaters coöperating with said aprons to thresh out the peas, a dividing-board below the beaters and between the lower portions of the aprons means for varying the flexibility of the aprons, auxiliary beaters coöperating with said dividing-board to separate the unthreshed peas passing the primary beaters, and a shaking-screen arranged below the dividing-board and aprons, substantially as set forth.

In testimony whereof I have hereunto set my hand in presence of two subscribing witnesses.

ED J. TRAUT.

Witnesses:
C. C. HINES,
J. C. WILLSON.